US010648551B2

(12) United States Patent
Woods

(10) Patent No.: US 10,648,551 B2
(45) Date of Patent: May 12, 2020

(54) GEARBOX SPLIT TORQUE EQUALIZATION SYSTEM

(71) Applicant: Bell Helicopter Textron Inc., Fort Worth, TX (US)

(72) Inventor: Ron L. Woods, Weatherford, TX (US)

(73) Assignee: BELL HELICOPTER TEXTRON INC., Forth Worth, TX (US)

(*) Notice: Subject to any disclaimer, the term of this patent is extended or adjusted under 35 U.S.C. 154(b) by 183 days.

(21) Appl. No.: 15/832,444

(22) Filed: Dec. 5, 2017

(65) Prior Publication Data

US 2019/0170237 A1 Jun. 6, 2019

(51) Int. Cl.

| F16H 57/022 | (2012.01) |
|---|---|
| F16H 1/22 | (2006.01) |
| B64C 27/12 | (2006.01) |
| F15B 11/16 | (2006.01) |
| B64D 35/00 | (2006.01) |
| B64C 27/00 | (2006.01) |
| B64C 29/00 | (2006.01) |

(52) U.S. Cl.
CPC .......... *F16H 57/022* (2013.01); *B64C 27/00* (2013.01); *B64C 27/12* (2013.01); *B64C 29/0033* (2013.01); *B64D 35/00* (2013.01); *F15B 11/16* (2013.01); *F16H 1/22* (2013.01); *F15B 2211/7052* (2013.01); *F15B 2211/71* (2013.01); *F16H 2057/0221* (2013.01)

(58) Field of Classification Search
CPC . F16H 1/22; F16H 57/022; B64C 1/12; Y10T 74/19628; Y10T 74/19098
See application file for complete search history.

(56) References Cited

U.S. PATENT DOCUMENTS

| 2,386,367 | A | | 10/1945 | Taylor | |
|---|---|---|---|---|---|
| 2,496,857 | A | | 2/1950 | Val et al. | |
| 2,899,822 | A | * | 8/1959 | Matthews | F16H 1/22 73/862.31 |
| 4,251,987 | A | * | 2/1981 | Adamson | F02C 3/113 417/405 |
| 4,496,857 | A | | 1/1985 | Chao | |

(Continued)

FOREIGN PATENT DOCUMENTS

EP 3495688 B1 3/2020

OTHER PUBLICATIONS

EPO Search Report issued in EP Application Serial No. 18152626.0 dated Aug. 13, 2018, 4 pages.

(Continued)

*Primary Examiner* — Daniel D Yabut
(74) *Attorney, Agent, or Firm* — Patent Capital Group

(57) ABSTRACT

In one embodiment, a split torque gearbox can include a first compound gear and a second compound gear. The compound gears can each include a piston housing with a fluid inlet and a piston received in the piston housing and defining a space within the first piston housing exposed to the fluid inlet. The split torque gearbox can include a fluid line coupled to each of the fluid inlets to supply a fluid to the pistons at a predetermined pressure, the fluid line coupled to the second fluid inlet to supply fluid to the second piston assembly at the predetermined pressure. Pressure developed in the pistons is equal for all gear shafts, and can equalize torque imbalances in the split torque gearbox.

17 Claims, 5 Drawing Sheets

(56) References Cited

U.S. PATENT DOCUMENTS

| | | | |
|---|---|---|---|
| 5,791,592 A * | 8/1998 | Nolan | B64C 27/14 244/17.11 |
| 6,619,157 B1 | 9/2003 | Morrow | |
| 8,215,198 B2 * | 7/2012 | Masuo | B23F 23/10 74/409 |
| 2006/0266883 A1 | 11/2006 | Gmirya | |
| 2012/0180597 A1 | 7/2012 | Stamps et al. | |
| 2015/0060596 A1 | 3/2015 | Garcia | |
| 2017/0284535 A1 | 10/2017 | Ehinger | |

OTHER PUBLICATIONS

EPO Examination Report issued in EP Application Serial No. 18152626.0 dated Mar. 28, 2019, 4 pages.
EPO Examination Report issued in EP Application Serial No. 18152626.0 dated Aug. 28, 2018, 4 pages.
Krantz, et al., "Split Torque Transmission Load Sharing," NASA Technical Memorandum 105884, AVSCOM Technical Report 92-C-030, Oct. 28, 1992, 26 pages; https://ntrs.nasa.gov/archive/nasa/casi.ntrs.nasa.gov/19930003548.pdf.

* cited by examiner

GEARBOX SPLIT TORQUE EQUALIZATION SYSTEM

TECHNICAL FIELD

This disclosure relates generally to aircraft drive systems and, more particularly, to a technique for enabling gearbox split torque equalization for aircraft drive systems.

BACKGROUND

Rotorcraft drive systems can include various components that produce and transfer power, such as gearboxes that convert engine power into torque for rotorcraft rotors. The gearbox provides controlled application of the power through the use of gears and gear trains to provide speed and torque conversions from a rotating power source, such as an engine or motor, to another component.

SUMMARY

In one embodiment, an apparatus includes first and second compound gears, each of which includes a piston assembly housing. Each piston assembly housing includes a piston housing including a fluid inlet and a piston coupled to a driveshaft. Each of the pistons s received in a respective piston housing and defines space within the piston housing exposed to the respective fluid inlet. The apparatus further includes a fluid line coupled to both fluid inlets to supply a fluid to each of the piston assemblies at a predetermined pressure. In one embodiment, the fluid is one of hydraulic fluid and engine oil. In certain embodiments, each of the compound gears includes a helical gear and the apparatus further includes a helical collector gear meshed with the helical gears and which may be coupled to a rotor by a driveshaft. The apparatus may further include a drive gear, in which each of the helical gears is an output gear of the respective compound gear and in which each compound gear includes an input gear coupled to the respective output gear by a driveshaft and meshed with the drive gear.

In other embodiments, the drive gear may be coupled to an engine by a driveshaft and the drive gear and input gears may include spur gears. The apparatus may further include a valve in the fluid line to isolate a source of the fluid from the fluid inlets. Additionally, each of the piston assemblies may include a seal disposed between the piston and piston housing. Moreover, each driveshaft may be secured by a bearing configured to permit the driveshaft to move along a direction parallel to a long axis of the respective driveshaft.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
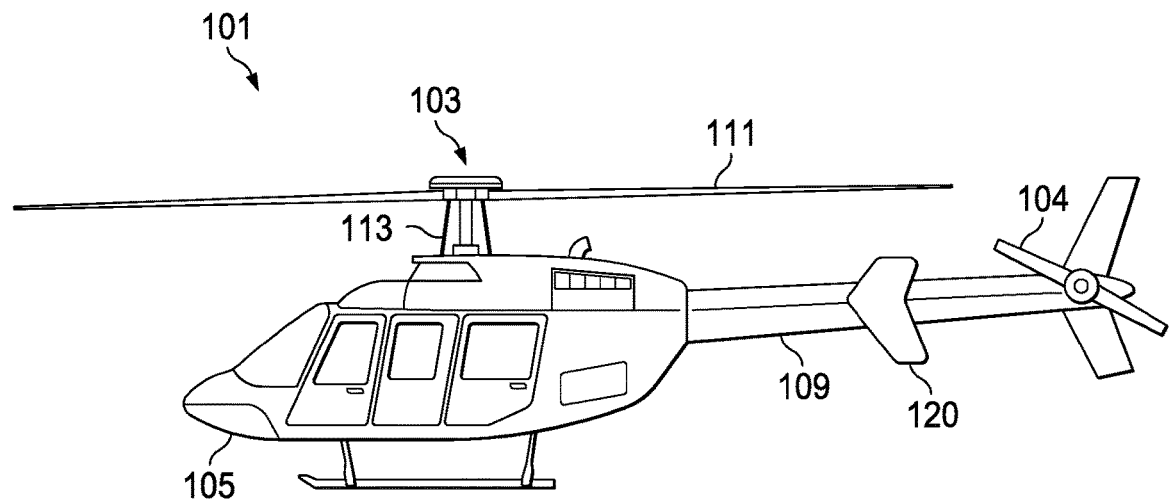
FIG. 1 is a schematic illustration of an example aircraft in accordance with embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 is a schematic illustration of an example rotorcraft 101 in accordance with embodiments of the present disclosure. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105, anti-torque system 104, and an empennage 109 that can include a horizontal stabilizer 120. Torque is supplied to rotor system 103 and anti-torque system 104 using at least one engine housed in the fuselage 105.

Figure 2:
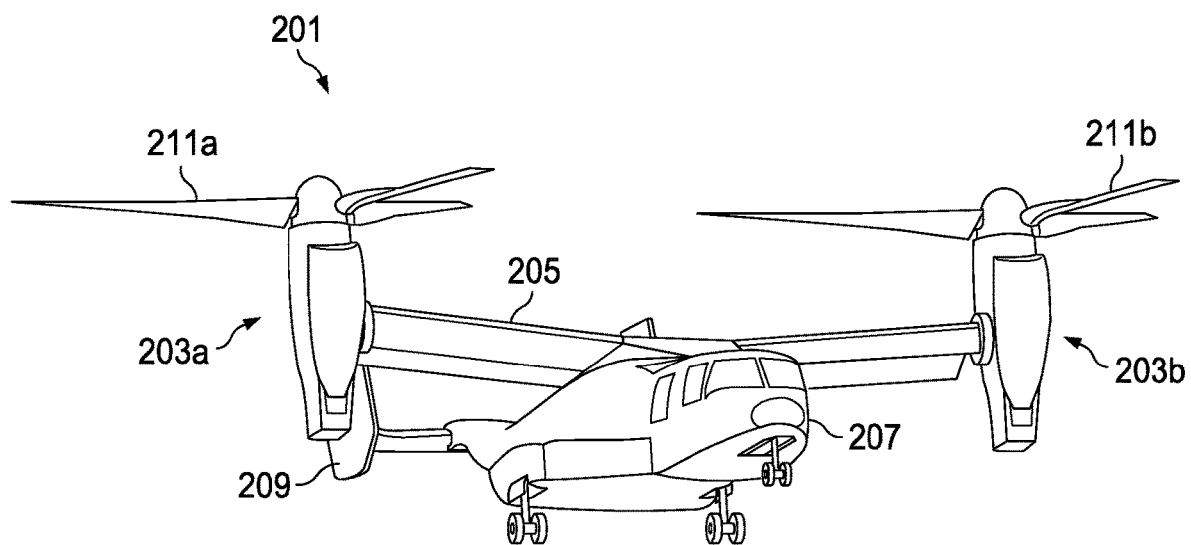
FIG. 2 is a schematic illustration of another example aircraft in accordance with certain embodiments.

FIG. 2 illustrates a perspective view of an example tiltrotor aircraft 201. Tiltrotor aircraft 201 can include nacelles 203a and 203b, a wing 205, a fuselage 207, and a tail member 209. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well-suited to implement embodiments of the present disclosure, the described embodiments can also be implemented using non-aircraft vehicles and devices.

As mentioned above, a rotorcraft (or tiltrotor aircraft) can include an engine that supplies power to one or more rotors, such as a main rotor and/or an anti-torque rotor. The rotorcraft can include a gearbox that converts power from the engine to torque. Some embodiments of a gearbox can include a split torque design.

Achieving the aforementioned advantages of split torque gearbox designs can be cumbersome, often resulting in unequal torque sharing between gears without close tolerance gear geometry and gear mounting. Torsionally-compliant gear shafts can be used to allow for torsional windup of the shafts to compensate for adverse tolerance stack-ups. Torsional fatigue strength of the compliant shafts resulting from torsional windup can limit the amount of compliance, thus preventing the optimum equal torque split.

This disclosure describes systems and methods to split drive torque into more than one gear mesh, thus reducing the size required for the mating gears. The systems and methods disclosed herein use axially floating compound helical gear shafts that are axially restrained by bearings mounted to pistons that are reacted by a common fluid system that naturally provides equal pressure to all pistons in the circuit (similar to disc brake systems in vehicles). Example embodiments that may be used to implement a gearbox split torque equalization system are described below with more particular reference to the remaining FIGURES.

Figure 3:
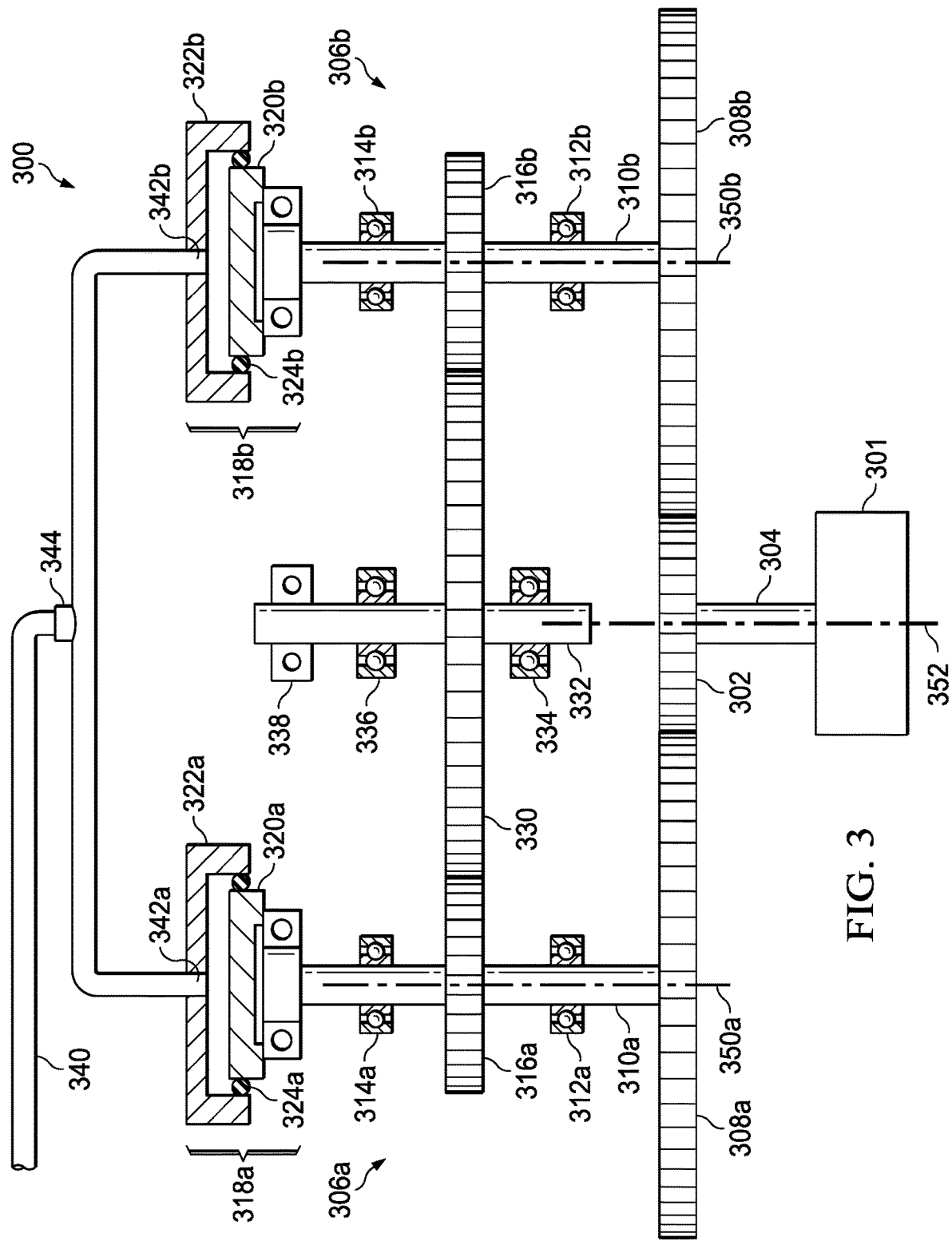
FIG. 3 is a schematic diagram of an example gearbox split torque equalization system in accordance with embodiments of the present disclosure.

FIG. 3 is a schematic diagram of an example gearbox split torque equalization system 300 in accordance with embodiments of the present disclosure. The example gearbox split torque equalization system 300 includes a gear train that includes a drive gear 302 coupled to an input pinion 304 that is coupled to a mechanical power source 301, such as an engine of rotorcraft 101. The mechanical power source 301 can supply or relay or otherwise mechanically transfer a torque to the drive gear 302 through the input pinion 304. The drive gear 302 can be a helical or spur mesh gear that includes a predetermined number of gear teeth or cogs. The drive gear 302 can interface through the gear teeth to a split torque gearbox. The split torque gearbox can include two compound gears, such as a first compound gear 306a and a second compound gear 306b. Two compound gears are shown for illustrative purposes, but it is understood that more than two compound gears for the split torque gearbox is also within the scope of this disclosure.

The first compound gear 306a can include an input gear 308a. The input gear 308a can be a helical or spur gear that can mesh with the drive gear 302. Drive gear 302 can include a first number of teeth, while the input gear 308a can include a second number of teeth or cogs, the first number being different from the second number. The drive gear 302 can relay torque to the compound gear 306a through the meshing of the drive gear 302 and the input gear 308a.

The first compound gear 306a also includes an output gear 316a. Output gear 316a can be coupled to the input gear 308a by an intermediate drive shaft 310a. The intermediate drive shaft 310a can be secured to a chassis or other rigid structure of the rotorcraft by bearings 312a and 314a. Bearings 312a and 314a can secure the intermediate drive shaft 310a radially, but allow the drive shaft 310a to float axially (i.e., along a direction substantially parallel to the axis 350a).

The output gear 316a can mesh with a collector gear 330 to relay torque from the output gear 316a to the collector gear 330. The collector 330 can be secured to a chassis by bearings 334 and 336. Bearings 334 and 336 can fix the collector gear 330 axially and radially. The collector gear 330 can be coupled by a drive shaft 332 to a rotor assembly (which is illustrated as rotor assembly 338).

The second compound gear 306b can include an input gear 308b. The input gear 308b can be a helical or spur gear that can mesh with the drive gear 302. Drive gear 302 can include a first number of teeth, while the input gear 308b can include a second number of teeth or cogs, the first number being different from the second number. The drive gear 302 can relay torque to the compound gear 306b through the meshing of the drive gear 302 and the input gear 308b.

The second compound gear 306b also includes an output gear 316b. Output gear 316b can be coupled to the input gear 308b by an intermediate drive shaft 310b. The intermediate drive shaft 310b can be secured to a chassis or other rigid structure of the rotorcraft by bearings 312b and 314b. Bearings 312b and 314b can secure the intermediate drive shaft 310b radially, but allow the drive shaft 310b to float axially (i.e., along a direction substantially parallel to the axis 350b. The output gear 316b can mesh with a collector gear 330 to relay torque from the output gear 316b to the collector gear 330.

The gearbox split torque equalization system 300 includes a fluid line 340. The fluid line 340 can deliver fluid to the gearbox split torque equalization system 300. For example, the first compound gear 306a can include a first piston assembly 318a. The first piston assembly 318a can include a piston 320a that is coupled to the intermediate shaft 310a. The piston 320a can be received into a piston assembly housing 322a. The fluid line 340 can deliver fluid to a space formed between the piston 320a and the piston assembly housing 322a by a fluid inlet 342a. Fluid can be retained within the space formed between the piston assembly housing 322a and the piston 320a by a seal 324a.

Similarly, the second compound gear 306b can include a second piston assembly 318b. The second piston assembly 318b can include a piston 320b that is coupled to the intermediate shaft 310b. The piston 320b can be received into a piston assembly housing 322b. The fluid line 340 can deliver fluid to a space formed between the piston 320b and the piston assembly housing 322b by a fluid inlet 342b. Fluid can be retained within the space formed between the piston assembly housing 322b and the piston 320b by a seal 324b.

Figure 4A:
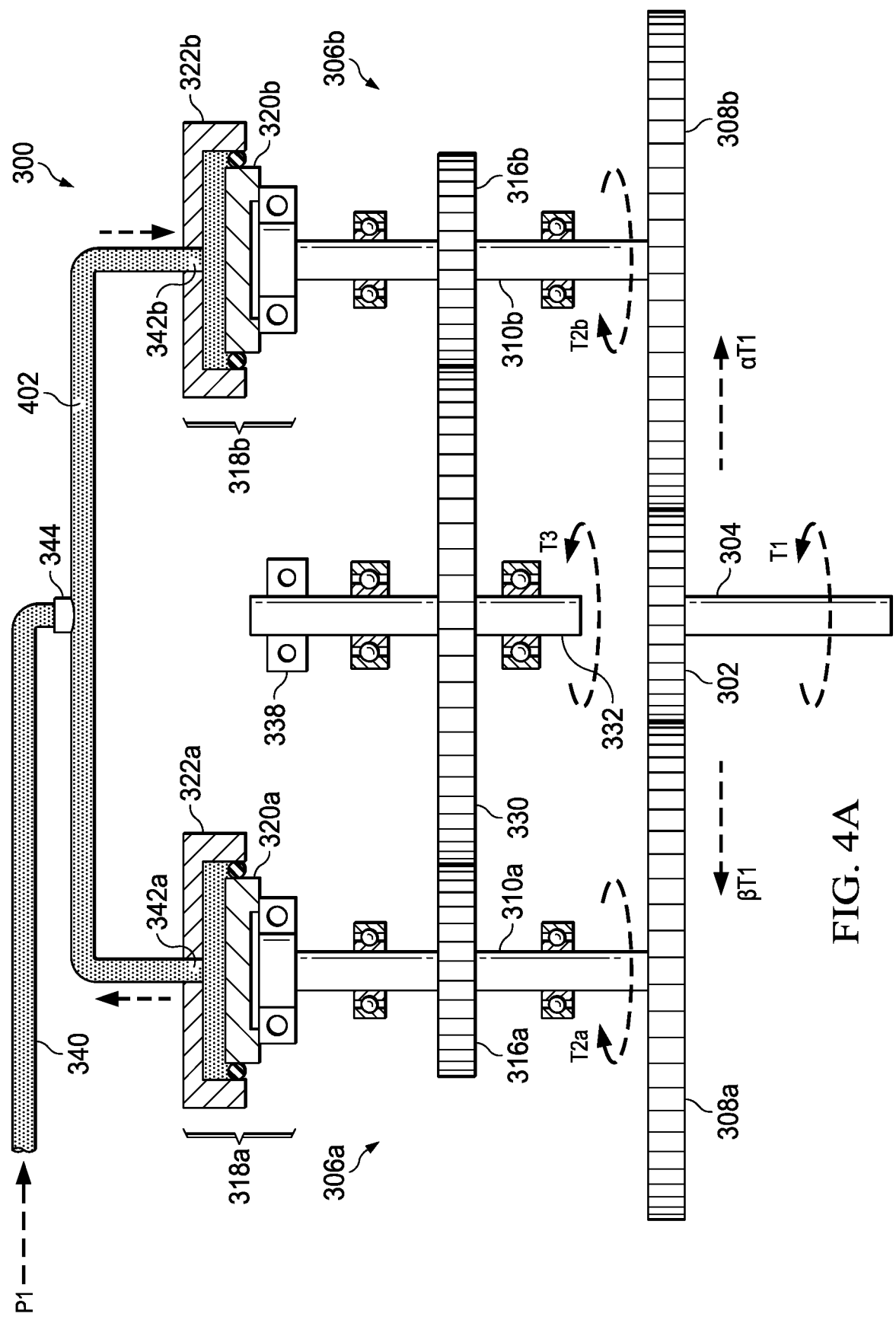
FIG. 4A is a schematic diagram of a close-up view of the example gearbox split torque equalization system of FIG. 3 in accordance with embodiments of the present disclosure.
Figure 4B:
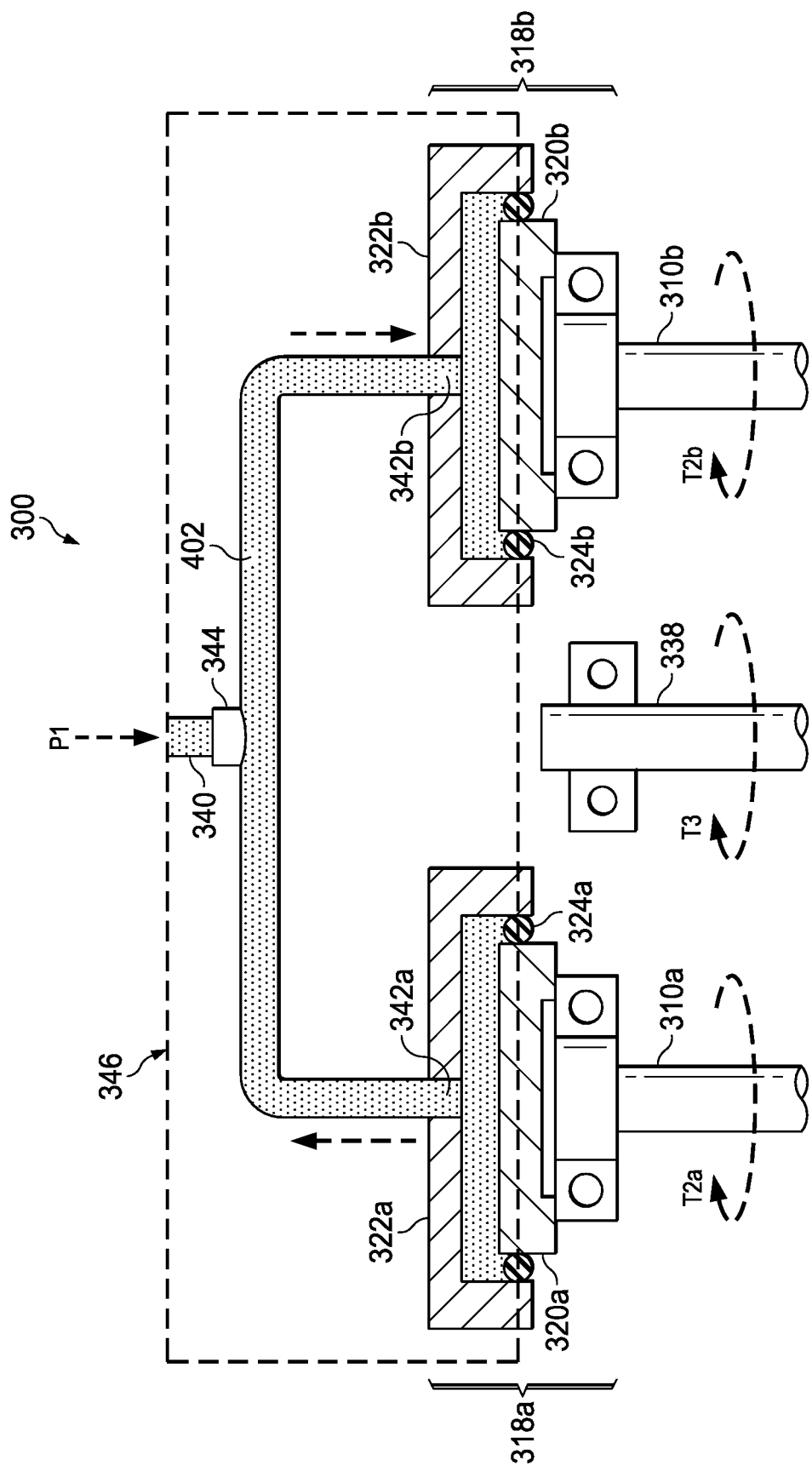
FIG. 4B is a schematic diagram of a close-up view of the example gearbox split torque equalization system of FIG. 4A in accordance with embodiments of the present disclosure.

FIG. 4A is a schematic diagram of an example operational view of the example gearbox split torque equalization system of FIG. 3 in accordance with embodiments of the present disclosure. FIG. 4B is a schematic diagram of a close-up view of the example gearbox split torque equalization system of FIG. 4A in accordance with embodiments of the present disclosure. The drive gear 302 is driven in rotation about axis 352 by an engine 301 or by a drivetrain (not shown) which joins the engine to the gearbox split torque equalization system 300. The gearbox split torque equalization system 300 is configured to provide two paths for the transfer of torque from drive gear 302 to collector gear 330. Torque T1 that is supplied to the drive gear 302 is split between the first compound gear 306a and the second compound gear 306b. The first compound gear 306a includes an input gear 308a, which is coupled to an intermediate shaft 310a. Torque T2a is transferred from the input gear 308a by the intermediate shaft 310a to an output gear 316a. Output gear 316a transfers a component of torque T3 to collector gear 330. A second torque path can include the second compound gear. The drive gear 302 transfers torque T2b the input gear 308b. Torque T2b is transferred from the input gear 308b by the intermediate shaft 310b to an output gear 316b. Output gear 316b transfers torque T3 to collector gear 330.

In embodiments, the input gears 316a and 316b are helical gears that mesh with a helical collector gear 330. During operation, an imbalance in axial load can occur when one gear member exerts more (or less) tooth load than others at the gear mesh, which can result in an unequal torque split, $T2a \neq T2b$.

A fluid 402 can be supplied to the first and second compound gears 306a and 306b to equalize the torque imbalance. The fluid 402 can be provided through the fluid line 340 at a pressure P1 and introduced into each piston assembly 306a and 306b by a fluid inlet 342a and 342b, respectively. By way of example, if one gear member of output gear 316a tries to exert more (or less) tooth load than the others at the gear mesh, the resultant axial load generated from the helical gear teeth will exert a proportional axial force on the piston 320a, thus increasing (or decreasing) the back-pressure of fluid 402 in the fluid line 340. This fluid backpressure will in turn create higher (or lower) pressure at all other pistons in the circuit, such as at piston 320b of the second compound gear 306b, which can increase (or decrease) the other gear tooth loads. Since piston 320b is reacting to the axial loads from the other gears in mesh, the gear tooth reaction forces at all gear mesh positions will thus necessarily be equalized by the common fluid circuit 346. Designing for assured equal load distribution between gears will lower the strength requirement otherwise required when designing for an anticipated unequal torque split, thus minimizing the weight.

In embodiments, a valve 344 can be used to close the fluid circuit at a location proximate the fluid inlets 342a and 342b. The valve 344 can be electronically activated to provide more fluid (or more pressure) into the fluid circuit 346 as needed. In embodiments, the fluid 402 used for the fluid circuit can be a hydraulic fluid or can be engine oil or other fluid. The use of engine oil has an additional advantage in that leaked oil into the gearbox can lubricate gears and shafts of the gearbox.

Hydraulic pressure equalization ensures torque split is equal between the gears of the gearbox. When helical axial loads create axial movement of helical gears, fluid pressure on pistons coupled to the gears can balance torque splits. Pressure developed in pistons is equal at all gear shafts, and therefore, gear torque loads are equal and split equally.

Figure 5:
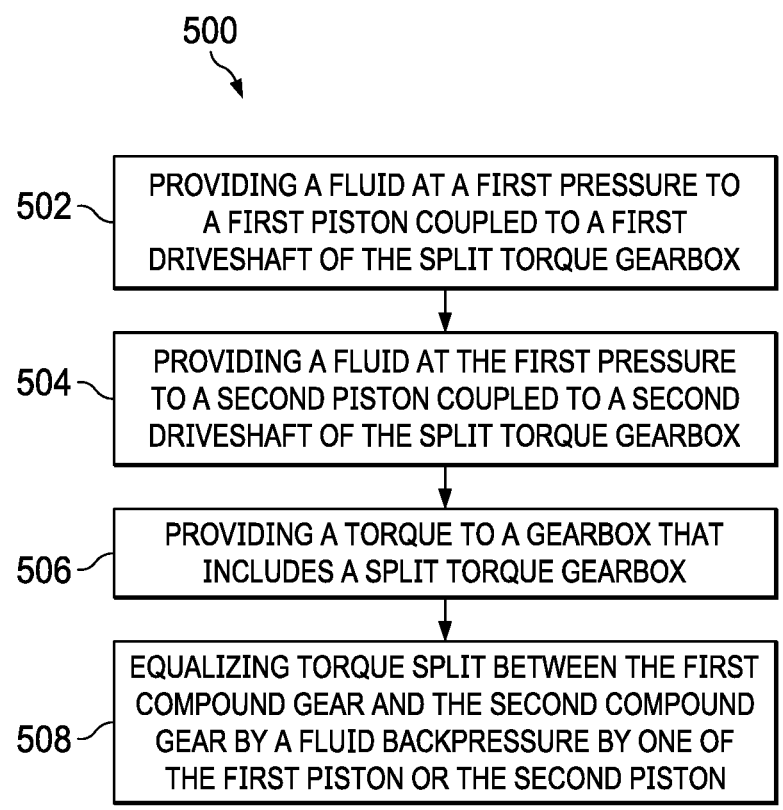
FIG. 5 is a process flow diagram for equalizing torque split in a gearbox by a fluid in accordance with embodiments of the present disclosure.

FIG. 5 is a process flow diagram 500 for equalizing torque split in a gearbox by a fluid in accordance with embodiments of the present disclosure. A fluid can be provided at a pressure P1 to a fluid inlet of a piston coupled to a first compound gear of a gearbox (502). The fluid can be provided at the same pressure P1 to a fluid inlet of a piston coupled to a second compound gear of the gearbox (504). A torque can be provided to the split torque gearbox (506), which can result in an unequal torque split between the first compound gear and the second compound gear. The fluid provided at the pressure P1 reacts with pistons to balance the unequal torque split between the first and second compound gears (508).

The embodiments described throughout this disclosure provide numerous technical advantages that are readily apparent to those of skill in the art. Among the advantages includes an equal or near equal torque split between the two gear trains of the torque split gearbox. The split torque gearbox equalization system can be advantageous by facilitating a high ratio of speed reduction at the final stage, a reduction of the number of reduction stages, a decrease in energy losses, an increase in reliability of the separate drive paths, fewer gears and bearings, and lower noise.

Though illustrated in the context of aircraft, such as a rotorcraft, aspects of the gearbox split torque equalization system can be used in other applications. Among the other applications include, but are not limited to, ships or other watercraft, wind turbines, or other applications that use large torque transmissions.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An apparatus comprising:
a first compound gear comprising:
a first piston assembly comprising:
a first piston housing comprising a first fluid inlet;
a first piston coupled to a first driveshaft, the first piston received in the first piston housing and defining a space within the first piston housing exposed to the first fluid inlet, wherein the first driveshaft is secured via a first bearing, the first bearing preventing radial movement of the first driveshaft and permitting axial movement of the first driveshaft; and
a first seal comprising an O-ring disposed between the first piston and the first piston housing;
a second compound gear comprising:
a second piston assembly comprising:
a second piston housing comprising a second fluid inlet;
a second piston coupled to a second driveshaft, the second piston received in the second piston housing and defining a space within the second piston housing exposed to the second fluid inlet, wherein the second driveshaft is secured via a second bearing, the second bearing preventing radial movement of the second driveshaft and permitting axial movement of the second driveshaft; and
a second seal comprising an O-ring disposed between the second piston and the second piston housing; and
a fluid line coupled to the first fluid inlet to supply a fluid to the first piston assembly at a predetermined pressure, the fluid line coupled to the second fluid inlet to supply fluid to the second piston assembly at the predetermined pressure.

2. The apparatus of claim 1, wherein the fluid comprises at least one of hydraulic fluid and engine oil.

3. The apparatus of claim 1, wherein the first compound gear comprises a first helical gear and the second compound gear comprises a second helical gear, the apparatus further comprising a helical collector gear meshed with the first helical gear and the second helical gear.

4. The apparatus of claim 3, wherein the helical collector gear is coupled to a rotor by a third driveshaft.

5. The apparatus of claim 3, further comprising a drive gear, and wherein:
the first helical gear is a first output gear of the first compound gear, the first compound gear further comprising a first input gear coupled to the first output gear by a fourth driveshaft, the first input gear meshed with the drive gear; and wherein
the second helical gear is a second output gear of the second compound gear, the second compound gear further comprising a second input gear coupled to the second output gear by a fifth driveshaft, the second input gear meshed with the drive gear.

6. The apparatus of claim 5, wherein the drive gear is coupled to an engine by a sixth driveshaft.

7. The apparatus of claim 5, wherein the drive gear, first input gear, and the second input gear comprise spur gears.

8. The apparatus of claim 1, further comprising a valve in the fluid line to isolate a source of the fluid from the first fluid inlet and the second fluid inlet.

9. An apparatus comprising:
an engine;
a rotor assembly; and
a split torque gearbox, the split torque gearbox comprising:
a first compound gear comprising:
a first piston assembly comprising:
a first piston housing comprising a first fluid inlet;
a first piston coupled to a first driveshaft, the first piston received in the first piston housing and defining a space within the first piston housing exposed to the first fluid inlet, wherein the first driveshaft is secured via a first bearing, the first bearing preventing radial movement of the first driveshaft and permitting axial movement of the first driveshaft; and
a first seal comprising an O-ring disposed between the first piston and the first piston housing;
a second compound gear comprising:
a second piston assembly comprising:
a second piston housing comprising a second fluid inlet; a second piston coupled to a second driveshaft, the second piston received in the second piston housing and defining a space within the second piston housing exposed to the second fluid inlet, wherein the second driveshaft is secured via a second bearing, the second bearing preventing radial movement of the second driveshaft and permitting axial movement of the second driveshaft; and
a second seal comprising an O-ring disposed between the second piston and the second piston housing; and
a fluid line coupled to the first fluid inlet to supply a fluid to the first piston assembly at a predetermined pressure, the fluid line coupled to the second fluid inlet to supply fluid to the second piston assembly at the predetermined pressure.

10. The apparatus of claim 9, wherein the fluid comprises at least one of hydraulic fluid and engine oil.

11. The apparatus of claim 9, wherein the first compound gear comprises a first helical gear; and the second compound gear comprises a second helical gear, the split torque gearbox further comprising a helical collector gear meshed with the first helical gear and the second helical gear.

12. The apparatus of claim 11, wherein the collector gear is coupled to the rotor assembly by a third driveshaft.

13. The apparatus of claim 11, further comprising a drive gear, and wherein:
the first helical gear is a first output gear of the first compound gear, the first compound gear further comprising a first input gear coupled to the first output gear by a fourth driveshaft, the first input gear meshed with the drive gear; and wherein
the second helical gear is a second output gear of the second compound gear, the second compound gear further comprising a second input gear coupled to the second output gear by a fifth driveshaft, the second input gear meshed with the drive gear.

14. The apparatus of claim 13, wherein the drive gear is coupled to the engine by a sixth driveshaft.

15. The apparatus of claim 13, wherein the drive gear, first input gear, and the second input gear comprise spur gears.

16. The apparatus of claim 9, further comprising a valve in the fluid line to isolate a source of the fluid from the first fluid inlet and the second fluid inlet.

17. A method comprising:
providing a fluid to a first fluid inlet of a first piston, the first piston coupled to a first compound gear of a split torque gearbox, the fluid provided to the first fluid inlet at a predetermined pressure;

providing the fluid to a second fluid inlet of a second piston, the second piston coupled to a second compound gear of the split torque gearbox, the fluid provided to the second fluid inlet at the predetermined pressure P1;

providing a first torque to the first compound gear;

providing a second torque to the second compound gear; and balancing the first torque and the second torque based on a fluid backpressure exerted by one of the first piston and the second piston on the fluid;

wherein the first piston comprises a first piston housing comprising the first fluid inlet and wherein the first piston is coupled to a first driveshaft, the first piston received in the first piston housing and defining a space within the first piston housing exposed to the first fluid inlet and sealed by a first seal comprising an O-ring disposed between the first piston and the first piston housing, wherein the first driveshaft is secured via a first bearing, the first bearing preventing radial movement of the first driveshaft and permitting axial movement of the first driveshaft; and wherein the second piston comprises a second piston housing comprising the second fluid inlet and wherein the second piston is coupled to a second driveshaft, the second piston received in the second piston housing and defining a space within the second piston housing exposed to the second fluid inlet and sealed by a second seal comprising an O-ring disposed between the second piston and the second piston housing, wherein the second driveshaft is secured via a second bearing, the second bearing preventing radial movement of the second driveshaft and permitting axial movement of the second driveshaft.

\* \* \* \* \*